March 9, 1943.   A. C. CLAYTON   2,313,624
DRILLING AND BORING MACHINE
Filed March 26, 1941   3 Sheets-Sheet 2

Inventor,
A. C. Clayton
By: Glascock, Downing & Seebold
Attys.

March 9, 1943. A. C. CLAYTON 2,313,624
DRILLING AND BORING MACHINE
Filed March 26, 1941 3 Sheets-Sheet 3

Inventor,
A. C. Clayton
By: Glascock Downing & Seebold
Attys.

Patented Mar. 9, 1943

2,313,624

UNITED STATES PATENT OFFICE 2,313,624

DRILLING AND BORING MACHINE

Alec Charles Clayton, Yate, Bristol, England

Application March 26, 1941, Serial No. 385,339
In Great Britain December 13, 1939

2 Claims. (Cl. 77—1)

This invention relates to drilling and boring machines and has for its object to provide a machine adapted for precision work in which the essential elements of the machine are so designed and disposed as to secure an unusual facility of operation, precision and durability of accuracy, also to provide a ready combination of motions for performing the work required of such a machine.

The invention consists in a drilling or boring machine comprising a turntable for supporting the work piece, a pillar head adapted to carry a drill or boring or other rotary cutting tool, and means associated with the pillar head adapted to permit the tool to be brought into and secured in any desired position to operate on the work piece.

Thus, in accordance with the invention, the pillar head may comprise a swivel element in which the tool may be mounted and means whereby the swivel head may be advanced towards and retracted from and may be moved vertically and in a horizontal direction and inclined in any angular relationship with respect to the work piece.

The means on which the swivel head is mounted preferably forms a mounting for a motor and a driving connection between the motor and the swivel head for effecting rotation of a drill or other tool associated therewith, and the means in question may be arranged to be rotated about a normally horizontal axis with respect to a member forming part of the pillar head and to be moved in a vertical direction and to be rotated about the axis of the said member.

Conveniently, the pillar head is mounted in guides so that traversing motion in a horizontal plane in two directions at right angles one to the other may be imparted to it.

The invention will be described further in detail and by way of example with reference to the accompanying drawings in which.

Figure 1:
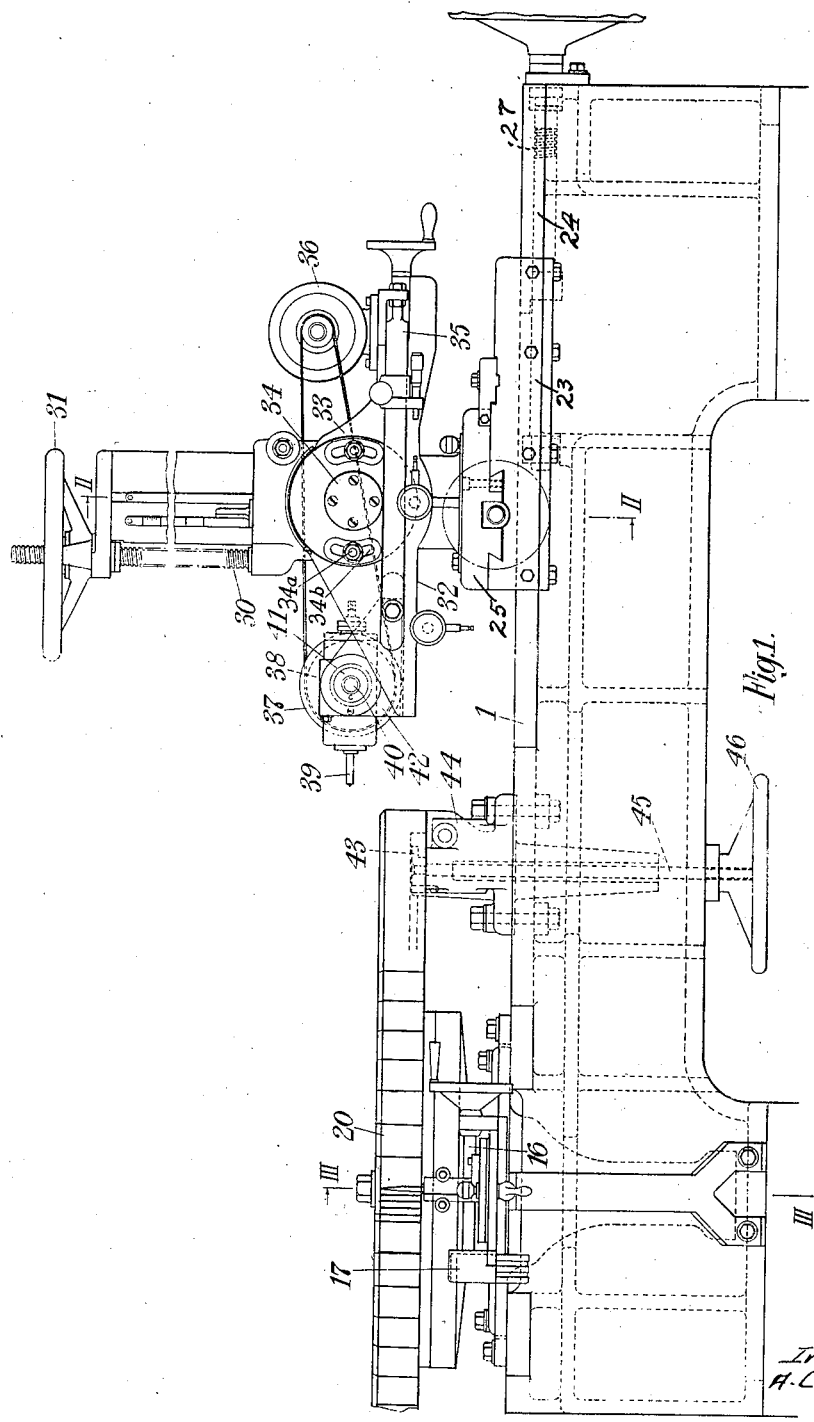
Figure 1 is a view in end elevation of a machine in accordance with the invention.
Figure 2:
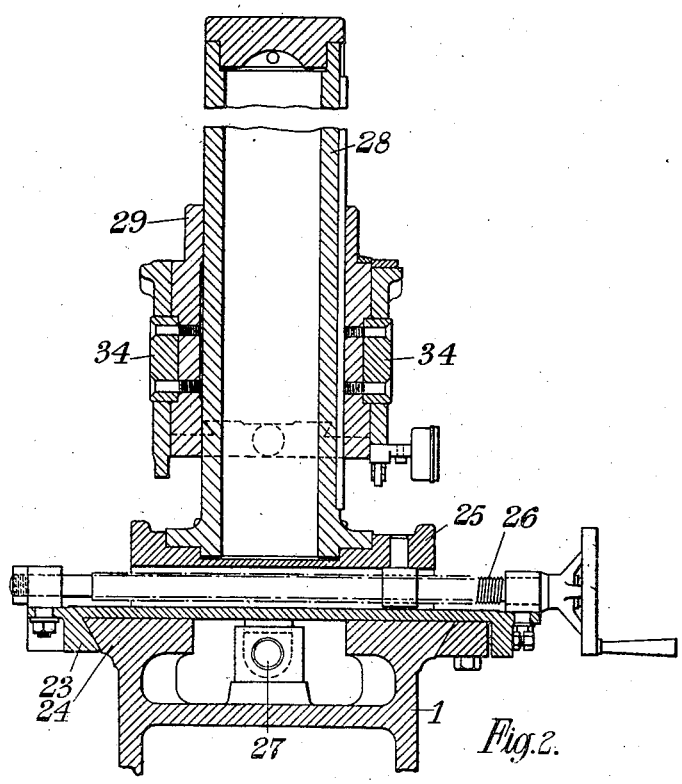
Figure 2 is a view in sectional elevation on a plane indicated by the line II—II of Figure 1.
Figure 4:
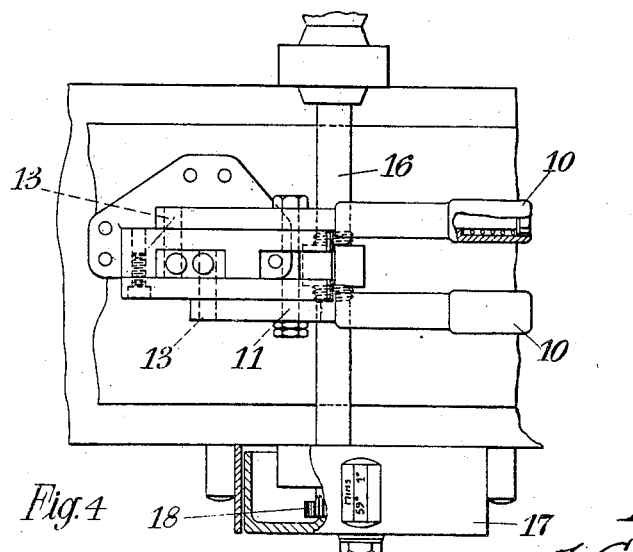
Figure 4 is a fragmentary view in plane of a detail.

On a bed 1 there is provided a rotatable turntable 2 for supporting the work.

This turntable is mounted upon a head 3 secured by screws 4 to a flange 5 on a vertical spindle 6, the lower end of which is secured in a ball bearing 7 and adjacent to its upper end is engaged in a large taper roller bearing 8.

For accurately indexing the table in degrees and fractions of degrees there are provided a pair of plungers 9 arranged to be manually operated by handles 10 pivoted at 11 and furnished at their ends with recesses 12 engaging pins 13, so that the plungers 9 may be moved into and out of engagement with one or other of a plurality of accurately spaced holes furnished in the lower surface of the turntable. These holes are located at intervals of one degree.

Figure 3:
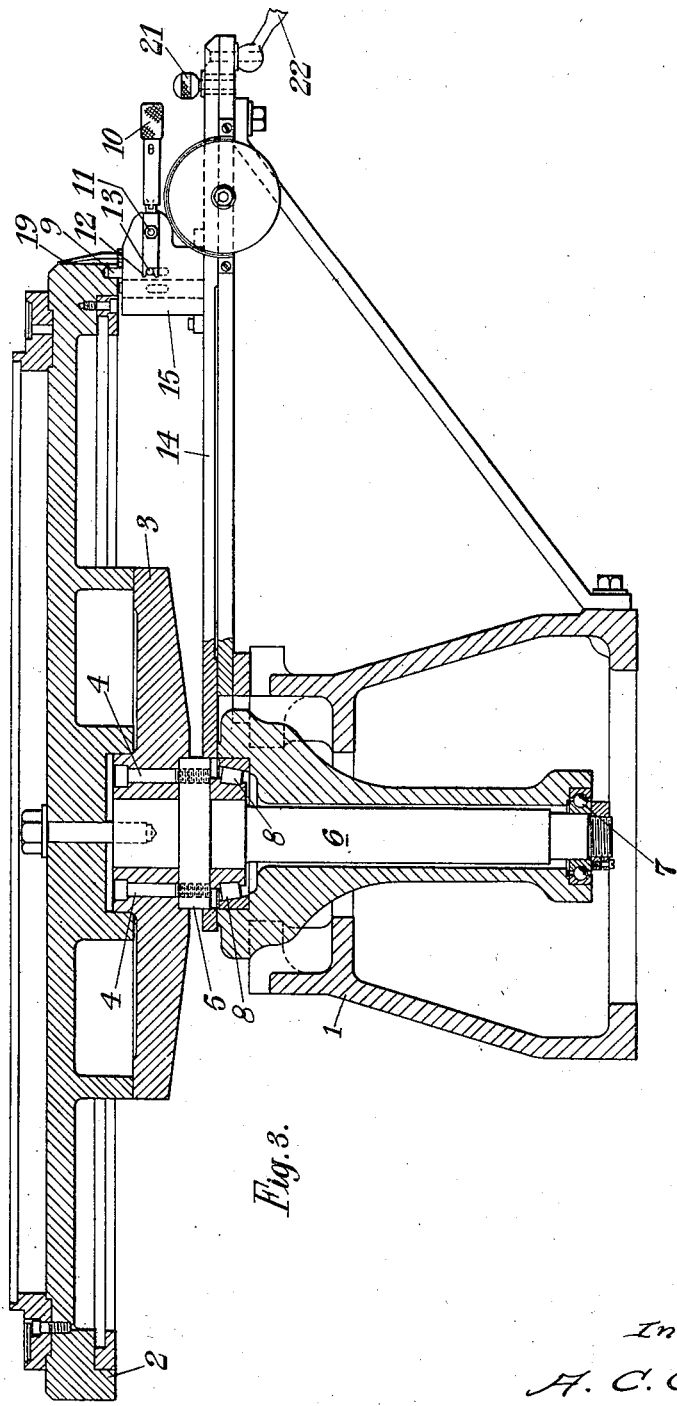
Figure 3 is a fragmentary view in sectional elevation on a plane indicated by the line III—III of Figure 1.

Either one or other of the pair of locking pins is employed at any given time according to the position of the holes in the turntable, the holes being formed in two rows, the holes in one row being in staggered relation with the holes in the other row, as follows from Figure 3.

If one of the holes provided in the base of the table is in advance of one of the plungers, movement of that plunger may be effected to lock the table. If, on the other hand, another hole is in position above the other plunger, movement of that plunger will be effective in securing the locking of the table.

To obtain indexing to a fraction of any degree a segment 14 rotatable about the flange 5 is provided, the segment in question functioning as a support for the block 15 in which the plungers, above referred to, are slidably engaged.

With the segment there is associated an accurate lead screw 16 on the end of which is attached a drum 17 so driven by gearing 18 that divisions marked upon it give a visual indication of a fraction of a degree through which the turntable has been rotated, the index finger 19 co-operating with a scale 20 on the turntable functioning to indicate degrees.

For indexing the table to any degree when a fraction of the degree is not required a locating pin 21 and in addition a clamp operated by a handle 22 is provided.

On the bed there is arranged a saddle 23 slidable on guides 24 and on the saddle there is secured a slide 25, to which motion may be imparted by a lead screw 26 in a direction at right angles to the direction in which the saddle may be moved by means of the lead screw 27.

To the slide is secured a vertical column 28 forming part of the pillar head and on this column there is arranged a sleeve 29 in association with a screwed shaft 30 and handwheel 31 whereby the sleeve may be adjusted and locked in any position into which it is so adjusted.

With the sleeve is connected a bedplate 32 by brackets 33 pivoted on the shaft 34 permitting motion of the bedplate about a horizontal axis the bedplate being locked in the desired position with the aid of bolts 34a extending through slots 34b and with the bedplate there is slidably associated a member 35 which forms a common base or support for a motor 36 and the swivelling head which comprises a casing 37 for a drive from the pulley 38 to the spindle of a chuck or the like in which is mounted a drill 39, the casing being furnished with trunnions 40 engaged in bearings 41 in standards 42 on the bedplate 32.

The turntable is formed so that it may be secured in position to give rigidity to the work on the turntable by the clamping means 43 associated with the supporting block 44 and actuated by the screwed spindle 45 and handwheel 46.

A machine as described above is particularly suitable for drilling holes in the peripheries of large rings, the ring being clamped by suitable means to the turntable which, as above indicated, is arranged to be rotated and to be locked or secured in any desired position so that it may be operated on by the control or other rotary tool associated with the swivel element of the pillar head.

I claim:

1. A drilling or boring machine including in combination a frame, a horizontal turntable mounted on the frame adjacent one end and adapted to support a workpiece, a vertically disposed pillar head mounted on the other end of the frame for longitudinal and transverse movement with respect to the turntable, said pillar head including a swivel element in which a cutting tool may be mounted, and means whereby the swivel element may be advanced towards and retracted from and may be moved vertically in a horizontal direction and inclined in any angular relationship with respect to the workpiece.

2. A drilling or boring machine comprising a bed, a turntable for supporting the work piece rotatably mounted in the bed, a pillar head adapted to carry a rotary cutting tool supported by the bed, means associated with the pillar head adapted to permit the tool to be brought into various positions to operate on the work piece and in particular to be moved about a horizontal axis and moved in a direction towards and away from the work piece and in a direction at right angles to such last mentioned direction, and also vertically, guides in which the pillar head is engaged adapted to permit the pillar head to be moved in a horizontal plane in paths at right angles one to the other and associated with the pillar head a carriage adapted to be moved in a vertical direction, a member forming a bedplate secured to the carriage and adapted to be moved about a horizontal axis, and a swivelling head secured to the bedplate in which the tool may be rotatably mounted so that the axis of rotation of the tool may, independently of the bedplate, be moved about a horizontal axis.

ALEC CHARLES CLAYTON.